(12) United States Patent
Nakano et al.

(10) Patent No.: US 7,681,442 B2
(45) Date of Patent: Mar. 23, 2010

(54) THROTTLE UPSTREAM PRESSURE ESTIMATING APPARATUS AND CYLINDER CHARGED AIR QUANTITY CALCULATING APPARATUS FOR INTERNAL COMBUSTION ENGINE

(75) Inventors: Tomoaki Nakano, Toyota (JP); Atsushi Koike, Anjo (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 0 days.

(21) Appl. No.: 12/119,781

(22) Filed: May 13, 2008

(65) Prior Publication Data

US 2008/0314132 A1 Dec. 25, 2008

(30) Foreign Application Priority Data

Jun. 22, 2007 (JP) ............................ 2007-164512
Jun. 26, 2007 (JP) ............................ 2007-167187

(51) Int. Cl.
*G01M 15/09* (2006.01)
(52) U.S. Cl. ................................. 73/114.32; 73/114.37
(58) Field of Classification Search ........................ None
See application file for complete search history.

(56) References Cited

U.S. PATENT DOCUMENTS

| | | | |
|---|---|---|---|
| 6,497,214 B2 | 12/2002 | Yagi | |
| 6,662,640 B2 | 12/2003 | Yagi | |
| 7,069,139 B2 * | 6/2006 | Muto et al. | 701/104 |
| 7,263,428 B2 * | 8/2007 | Kobayashi et al. | 701/108 |
| 7,418,857 B2 * | 9/2008 | Tanaka | 73/114.34 |
| 7,457,701 B2 * | 11/2008 | Tanaka | 701/103 |
| 2005/0234634 A1 * | 10/2005 | Beyer et al. | 701/114 |
| 2006/0276954 A1 * | 12/2006 | Muto et al. | 701/110 |

FOREIGN PATENT DOCUMENTS

| | | |
|---|---|---|
| EP | 1 837 512 | 9/2007 |
| JP | 2002-130042 | 5/2002 |
| JP | 2006-22763 | 1/2006 |

* cited by examiner

*Primary Examiner*—Lisa M Caputo
*Assistant Examiner*—Freddie Kirkland, III
(74) *Attorney, Agent, or Firm*—Nixon & Vanderhye PC

(57) ABSTRACT

In a non-critical pressure region where a pressure ratio [Pm/Pthrup(i−1)] of an intake air pressure Pm(throttle downstream pressure) detected by an intake air pressure sensor to a previous throttle upstream pressure Pthrup(i−1) is greater than a predetermined value B, the previous throttle upstream pressure Pthrup(i−1) is substituted for one of two terms of the throttle upstream pressures Pthrup(i) included in an intake system model so that present throttle upstream pressure Pthrup(i) is calculated. In a critical pressure region where the pressure ratio is less than or equal to the predetermined value B, a physical value f(Pm/Pthrup(i)) using a pressure ratio [Pm/Pthrup(i)] of the intake air pressure Pm to a present throttle upstream pressure Pthrup(i) as a parameter is regarded as a steady value fc so that the present throttle upstream pressure Pthrup(i) is calculated.

3 Claims, 9 Drawing Sheets

THROTTLE UPSTREAM PRESSURE ESTIMATING APPARATUS AND CYLINDER CHARGED AIR QUANTITY CALCULATING APPARATUS FOR INTERNAL COMBUSTION ENGINE

CROSS-REFERENCE TO RELATED APPLICATION

This application is based on Japanese Patent Applications No. 2007-164512 filed on Jun. 22, 2007 and No. 2007-167187 filed on Jun. 26, 2007, the disclosures of which are incorporated herein by reference.

FIELD OF THE INVENTION

The present invention relates to a throttle upstream estimating apparatus for an internal combustion engine which calculates an upstream side pressure of a throttle valve by using an intake system model and to a cylinder charged air quantity calculating apparatus for the internal combustion engine which calculates a cylinder charged air quantity.

BACKGROUND OF THE INVENTION

It is necessary to accurately perform an air-fuel ratio control (i.e., a fuel injection control) in order to satisfy severe law regulations relating to purification of exhaust gas. In order to perform accurate air-fuel ratio control, it is necessary to accurately calculate an air quantity charged into an engine cylinder (i.e., a cylinder charged air quantity) and appropriately set a fuel injection quantity in accordance with the cylinder charged air quantity.

In order to raise the accuracy for calculating the cylinder charged air quantity, data of the upstream side pressure of a throttle valve (hereafter referred to as "throttle upstream pressure") is required. In this regard, in a naturally aspirated engine, the throttle upstream pressure is equivalent to an atmospheric pressure. However, in the case of an engine with a supercharger, in an operation range where a charged pressure of a supercharger is generated, the throttle upstream pressure becomes higher than an atmospheric pressure due to the charged pressure.

Conventionally, an internal combustion engine is provided with a pressure sensor to detect a throttle upstream pressure, which however increases its manufacturing cost.

Among engines with superchargers, as disclosed in JP-2006-27763A and JP-2006-194107A (EP-1837512A1), a throttle upstream pressure (compressor downstream pressure) is calculated by using a compressor model (turbocharger model) in which supercharging effects by a compressor of the supercharger are modeled.

As disclosed in JP-2002-201998A (U.S. Pat. No. 6,497,214B2), a cylinder charged air quantity is calculated by using an equation of an intake system model made by modeling behaviors of an intake air during a period where a change in a throttle opening degree causes a change in an actual cylinder charged air quantity. In such an internal combustion engine, in order to reduce a CPU load for engine control by simplifying the calculation of a throttle flow rate parameter, a map (table) of the throttle flow rate parameter using a throttle opening degree as a parameter is stored in ROM in advance, and a throttle flow rate parameter corresponding to a present throttle opening degree is read by searching the map.

A compressor model (turbocharger model) has many adaptation subjects. Therefore, there is required a lot of work time for the adaptation. Further, there exists great influence of manufacture dispersion of the adaptation subjects, decreasing dispersion of estimated values of the throttle upstream pressure. Further, due to manufacture dispersion or aging of parts (throttle valve etc.) of the intake system, a throttle opening sensor, etc., there occurs a difference between a map value (adaptation value) of the throttle flow rate parameter and an actual value of the throttle flow rate parameter in an actual vehicle, decreasing the calculation accuracy of the cylinder charged air quantity.

SUMMARY OF THE INVENTION

The present invention is made in view of the above, and its object is to provide a throttle upstream pressure estimating apparatus for an internal combustion engine which is capable of securing the estimation accuracy of the throttle upstream pressure while eliminating or reducing the adaptation work time for a model to be used for estimating the throttle upstream pressure. Further, another object of the present invention is to provide a cylinder charged air quantity calculating apparatus for an internal combustion engine which is capable of improving the accuracy of a throttle flow rate parameter to be used while calculating the cylinder charged air quantity by using an intake system model and is capable of improving the calculation accuracy of the cylinder charged air quantity while meeting the demand of reducing the calculation load.

In order to achieve the above objects, according to the present invention, there is provided intake air pressure detecting means which detects downstream side pressure (hereafter referred to as "intake air pressure") Pm of a throttle valve provided in an intake passage of an internal combustion engine and throttle upstream pressure estimating means which repeats calculating throttle upstream pressure at a predetermined time interval by using an equation of an intake system model which models behaviors of an intake air during a period where a change in upstream side pressure of the throttle valve (hereafter referred to as "throttle upstream pressure") and a change in a throttle opening degree cause a change in the intake air pressure Pm to cause a change in an actual cylinder charged air quantity. The throttle upstream pressure estimating means substitutes a previous throttle upstream pressure Pthrup(i−1) for a part of a plurality of throttle upstream pressures included in the equation of the intake system model to calculate a present throttle upstream pressure Pthrup(i).

According to the present invention, additional work time for adaptation can be eliminated or reduced by calculating a throttle upstream pressure by using the intake system model for calculating a cylinder charged air quantity.

However, a plurality of terms using the throttle upstream pressure as a parameter are included in the equation of the intake system model for calculating the cylinder charged air quantity. In particular, a function for calculating a physical value f(Pm/Pthrup(i)) determined based on a ratio [Pm/Pthrup(i)] of the intake air pressure Pm to the present throttle upstream pressure Pthrup(i) is complicated. Therefore, it is difficult to solve the equation of the intake system model for the present throttle upstream pressure Pthrup(i).

Therefore, according to the present invention, the previous throttle upstream pressure Pthrup(i−1) is substituted for a part of a plurality of throttle upstream pressures included in the intake system model and the present throttle upstream pressure Pthrup(i) is calculated. That is, as shown in FIGS. 3 and 4, even when the downstream side pressure of the throttle valve (hereafter referred to as "intake air pressure") Pm sharply changes in a step-like manner, compared with such a change, a change in the throttle upstream pressure is very small. Since a difference between the previous throttle upstream pressure Pthrup(i−1) and the present throttle upstream pressure Pthrup(i) is very small, even if the previous throttle upstream pressure Pthrup(i−1) is substituted for a part of a plurality of throttle upstream pressures Pthrup(i) included in the equation of the intake system model, the model accuracy can be secured. As a result, it becomes possible to accurately calculate the throttle upstream pressure by using the intake system model for calculating the cylinder charged air quantity. Therefore, while eliminating or reducing the work time of adaptation for the model to be used for estimating the throttle upstream pressure Pthrup(i), estimation accuracy of the throttle upstream pressure Pthrup(i) can be secured.

According to the present invention, in a cylinder charged air quantity calculating apparatus for an internal combustion engine which calculates a cylinder charged air quantity by using an equation of an intake system model including a flow rate parameter depending on a throttle opening degree (hereafter referred to as "throttle flow rate parameter"), there are provided: storage means in which a map defining the relationship between a throttle opening degree and a throttle flow rate parameter is stored; learning means which learns, when a predetermined learning execution condition is fulfilled, a learning correction amount with respect to a map value based on a deviation between an actual value of the throttle flow rate parameter calculated according to a present throttle opening degree by using the equation of the intake system model and the map value of the throttle flow rate parameter read from the storage means correcting means which corrects the map value of the throttle flow rate parameter corresponding to the present throttle opening degree read from the storage means during an operating state of the internal combustion engine by using the learning correction amount; and cylinder charged air quantity calculating means which calculates a cylinder charged air quantity by using the map value of the throttle flow rate parameter corrected by the correcting means during the operating state of the internal combustion engine.

According to the present invention, when a predetermined learning execution condition is fulfilled, an actual value of the throttle flow rate parameter ($\mu \cdot A$) according to the present throttle opening degree is calculated by using the equation of the intake system model, a learning correction amount for a map value is learned based on the deviation between the actual value and the map value (adaptation value), the map value of the throttle flow rate parameter corresponding to the present throttle opening degree is corrected by using the learning correction amount during the operating state of the internal combustion engine, and a cylinder charged air quantity is calculated by using the map value after correction. With this configuration, even when there occurs a difference between a map value (adaptation value) of a throttle flow rate parameter and an actual value of the throttle flow rate parameter in an actual vehicle due to manufacture dispersion or aging of parts of the intake system, and the throttle opening sensor of the electronic throttle system, the map value of the throttle flow rate parameter can properly be corrected by using the learning correction amount learned based on the deviation between the actual value and the map value. As a result, it becomes possible to improve the accuracy of the throttle flow rate parameter by simple processing, to improve the calculation accuracy of the cylinder charged air quantity while meeting the demand of reducing the calculation load, and to reduce dispersion in drivability of vehicles and dispersion in emission.

BRIEF DESCRIPTION OF THE DRAWINGS

Other objects, features and advantages of the present invention will become more apparent from the following detailed description made with reference to the accompanying drawing, in which like parts are designated by like reference numbers and in which.

DESCRIPTION OF THE PREFERRED EMBODIMENTS

Now, a preferred embodiment in which the present invention is applied to an internal combustion engine having a supercharger will be described.

Figure 1:
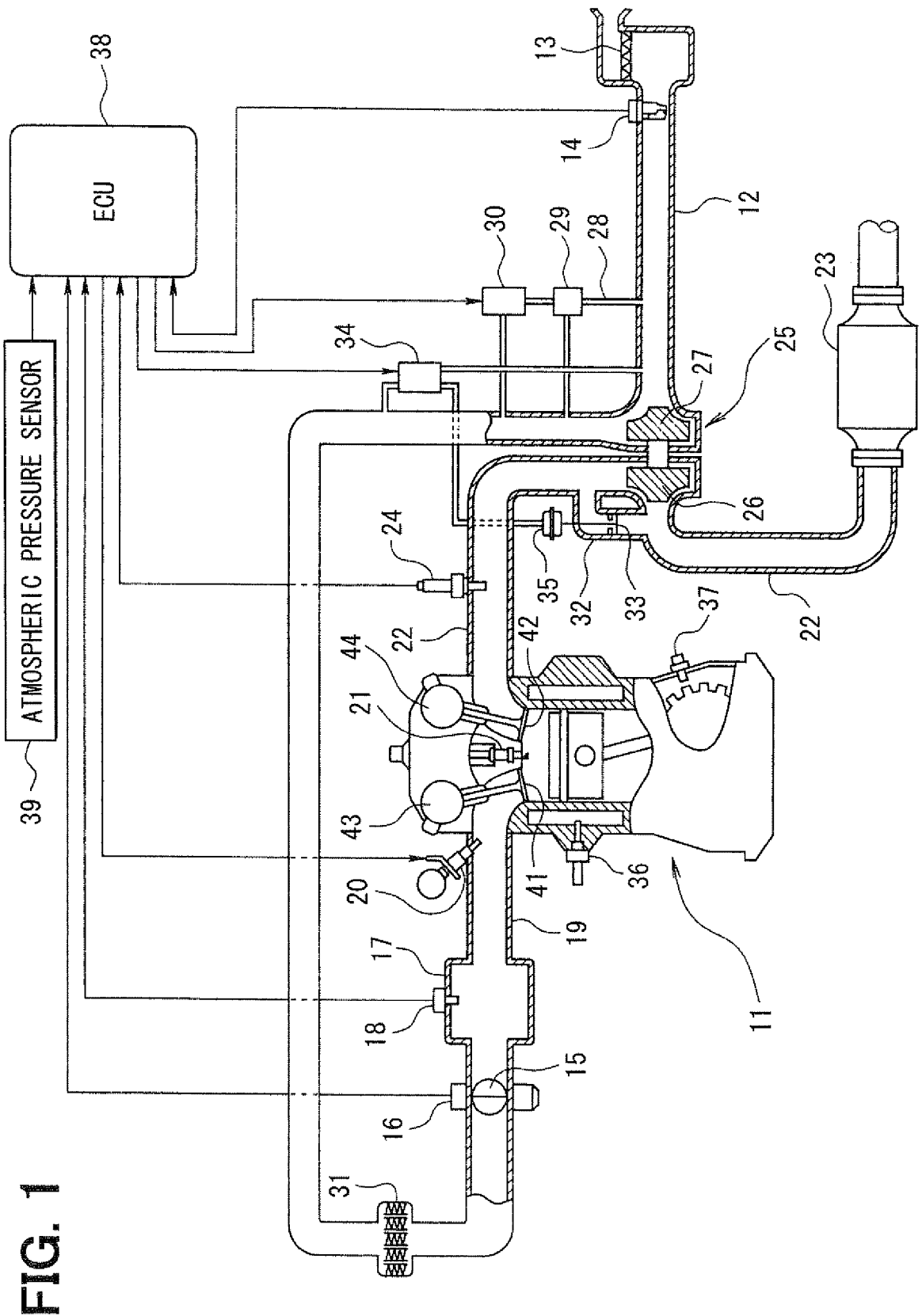
FIG. 1 is a schematic diagram showing an overall arrangement of an engine control system in accordance with one embodiment of the present invention.

First, with reference to FIG. 1, a schematic configuration of an overall arrangement of an engine control system will be described. An air cleaner 13 is provided at an upstream end of an intake pipe 12 (intake passage) of the engine 11, which is an internal combustion engine. An airflow meter 14, provided on a downstream side of the air cleaner 13, measures an intake air quantity. The airflow meter 14 is provided with an intake air temperature sensor (not shown) which detects an intake air temperature T.

There are provided, on a downstream side of the airflow meter 14, a compressor 27 of a supercharger 25 of an exhaust turbine type (to be described later) and an intercooler 31 which cools an intake air pressurized by the compressor 27. Provided on the downstream side of the intercooler 31 are a throttle valve 15 of which opening degree is controlled by a motor etc. and a throttle opening sensor 16 which detects a throttle opening degree.

A surge tank 17 is disposed on the downstream side of the throttle valve 15. An intake air pressure sensor 18 for detecting a downstream side pressure (hereafter referred to as "intake air pressure") Pm of the throttle valve 15 is provided in the surge tank 17. To the surge tank 17, an intake manifold 19 for introducing air into the cylinders of the engine 11 is connected. In the intake manifold 19, a fuel injection valve 20 for injecting fuel is attached near an intake port of each cylinder.

Spark plugs 21 are attached to respective cylinder heads of the engine 11, and the mixture in each cylinder is ignited by spark discharge occurring at each of the spark plugs 21. Further, the engine 11 is provided with variable valve timing units 43 and 44 for varying the opening and closing timing (valve timing) WT of the intake valve 41 and exhaust valve 42 according to an engine operating condition. Also, the construction may be such that the variable valve timing unit 43 on the intake side alone is provided and the variable timing unit 44 on the exhaust side may be omitted. The variable valve timing units 43 and 44 on both the intake and exhaust sides may be omitted.

On the other hand, the exhaust pipe 22 (exhaust passage) of the engine 11 is provided with an air-fuel ratio sensor 24 for detecting an air fuel ratio of the exhaust gas. On the downstream side of the air-fuel ratio sensor 24, there is provided a catalyst 23, such as a three-way catalyst, for purifying the exhaust gas.

The engine 11 is provided with a supercharger 25 of an exhaust turbine type. An exhaust turbine 26 is provided in the exhaust pipe 22 between the air-fuel ratio sensor 24 and the catalyst 23. A compressor 27 is provided in the intake pipe 12 between the airflow meter 14 and the throttle valve 15. The exhaust turbine 26 and the compressor 27 are connected with each other. The compressor 27 is rotated by rotating the exhaust turbine 26 by kinetic energy of the exhaust gas to supercharge the intake air.

Further, the intake pipe 12 is provided with, on the upstream side of the throttle valve 15, an intake bypass passage 28 for bypassing the upstream side and the downstream side of the compressor 27. There is provided, midway along the intake bypass passage 28, an air bypass valve (hereafter referred to as "ABV") 29 for opening and closing the intake bypass passage 28. By controlling a vacuum switching valve 30 for ABV, the opening and closing operation of "ABV") 29 is controlled.

The exhaust pipe 22 is provided with an exhaust bypass passage 32 for bypassing the upstream side and the downstream side of the exhaust turbine 26. A waste gate valve (hereafter referred to as 'WGV') for opening and closing the exhaust bypass passage 32 is provided midway along the exhaust bypass passage 32. WGV 33 is constructed such that its opening degree is controlled when an actuator 35 of a diaphragm type is controlled by controlling a vacuum switching valve 34 for WGV.

Further, there are mounted on a cylinder block of the engine 11, a cooling temperature sensor 36 for detecting a cooling temperature Thw and a crank angle sensor 37 for outputting a pulse signal every predetermined crank angle with rotation of a crank shaft of the engine 11, According to the signal outputted from the crank angle sensor 37, a crank angle and an engine rotational speed Ne are detected. An atmospheric pressure sensor 39 for detecting an atmospheric pressure is also provided.

Various detection signals of the sensors are inputted to an engine control circuit (hereafter referred to as ECU) 38. ECU 38 is constructed by using a microcomputer as a main body. By executing various engine control routines stored in its ROM (storage medium), ECU 38 controls a fuel injection quantity, ignition timing, and the like. At the same time, ECU 38 controls the rotation of the exhaust turbine 26 and the compressor 27 to control a charged pressure by controlling an opening degree of WGV 33 to control an exhaust gas amount supplied to the exhaust gas turbine 26.

Further, by using an equation of the intake system model made by modeling behaviors of the intake air during a period where a change in an upstream side pressure of a throttle valve 15 (hereafter referred to as "throttle upstream pressure") and a change in a throttle opening degree cause a change in an intake air pressure Pm to cause a change in an actual cylinder charged air quantity, ECU 38 calculates the throttle upstream pressure at a predetermined cycle.

In intake system models for calculating the cylinder charged air quantity, an equation for calculating a throttled air quantity is expressed by Equation (1) below.

$$Gin = \mu \cdot A \cdot \frac{Pthrup(i)}{\sqrt{R \cdot T}} \cdot f(Pm/Pthrup(i)) \tag{1}$$

Gin: throttled air quantity [kg/sec]

μ: flow coefficient

A: effective cross-section area of throttle opening [m$^2$]

Pthrup(i): throttle upstream pressure [Pa]

Pm: intake air pressure [Pa]

R: gas constant

T: intake air temperature [K]

F(Pm/Pthrup(i)): Physical value determined based on Pm/Pthrup(i)

$$A = \pi r^2 (1 - \cos^2 \theta) \tag{2}$$

r: radius of throttle valve [m]

θ: throttle opening degree

For finding a physical value f(Pm/Pthrup(i)) determined based on a ratio [Pm/Pthrup(i)] of the intake air pressure Pm to the throttle upstream pressure Pthrup(i), either Equation (3) or Equation (4) below is selected in accordance with the pressure ratio [Pm/Pthrup(i)].

In case of $$Pm/Pthrup(i) \leq \left(\frac{2}{\kappa+1}\right)^{\frac{\kappa}{\kappa+1}}$$

$$f(Pm/Pthrup(i)) = \sqrt{\kappa \cdot \left(\frac{2}{\kappa+1}\right)^{\frac{\kappa+1}{\kappa-1}}} = \text{steady value } fc \tag{3}$$

In case of $$Pm/Pthrup(i) > \left(\frac{2}{\kappa+1}\right)^{\frac{\kappa}{\kappa-1}} \qquad (5)$$

$$f(Pm/Pthrup(i)) = \sqrt{\frac{2\kappa}{\kappa-1}\left\{\left(\frac{Pm}{Pthrup(i)}\right)^{\frac{2}{\kappa}} - \left(\frac{Pm}{Pthrup(i)}\right)^{\frac{\kappa+1}{\kappa}}\right\}} \qquad (4)$$

($\kappa$: ratio of specific heat)

In the Equation of the Intake System Model Represented by Equation (1), there are included two terms using the throttle upstream pressure Pthrup(i) as a parameter. In particular, the functional equations (3) and (4) for calculating the physical value f(Pm/Pthrup(i)) determined based on the pressure ratio [Pm/Pthrup(i)] are complicated. Therefore, it is difficult to solve the equation of the intake system model for the throttle upstream pressure Pthrup(i).

Figure 3:
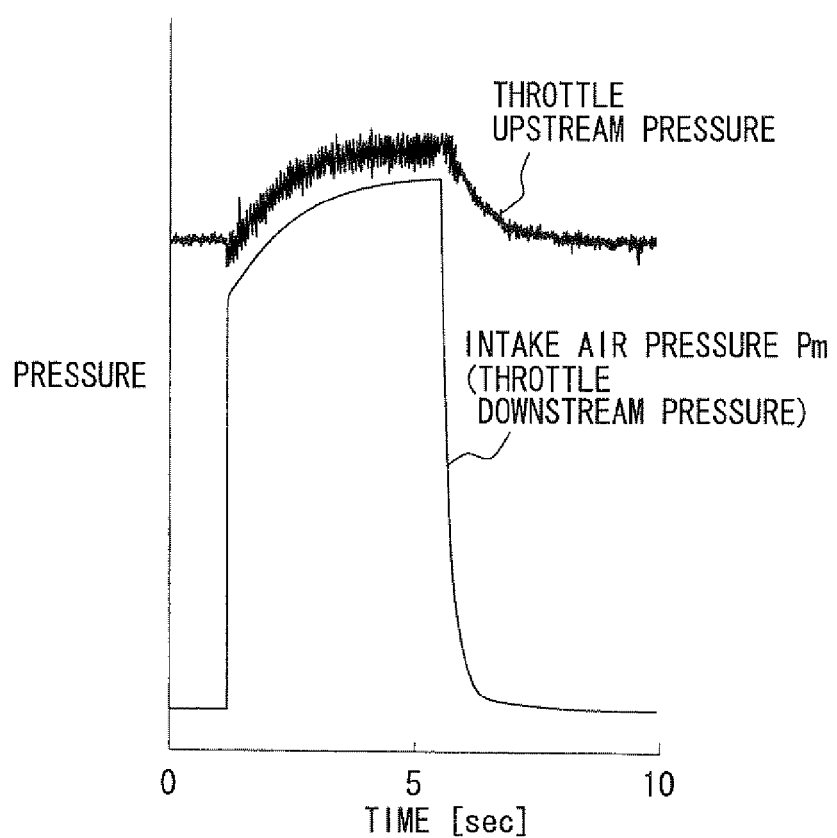
FIG. 3 is a time chart showing behaviors of an intake air pressure Pm (throttle downstream pressure) and a throttle upstream pressure during a transient state in a full-load region.
Figure 4:
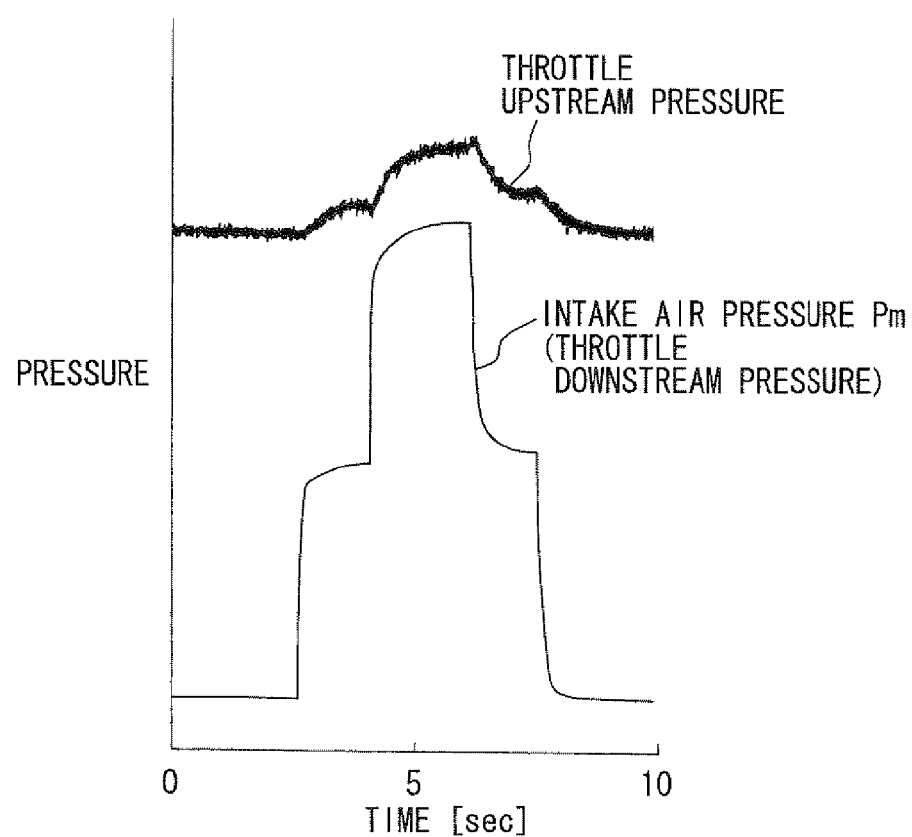
FIG. 4 is a time chart showing behaviors of an intake air pressure Pm (throttle downstream pressure) and a throttle upstream pressure during a transient state in a partial-load region.

Therefore, in the present embodiment, the previous throttle upstream pressure Pthrup(i) is substituted for one of the throttle upstream pressures Pthrup(i) of two terms included in the intake system model to calculate the present throttle upstream pressure Pthrup(i). That is, as shown in FIGS. 3 and 4, during a transient state, even when the intake air pressure Pm (a throttle downstream pressure) sharply changes in a step-like manner, compared with such a change, a change in the throttle upstream pressure is very small. Since a difference between the previous throttle upstream pressure (i−1) and the present throttle upstream pressure Pthrup(i) is very small, even if the previous throttle upstream pressure Pthrup(i−1) is substituted for one of the throttle upstream pressures Pthrup(i) of the two terms included in the intake system model, accuracy of the model can be secured.

In this case, as an equation of the intake system model for calculating the throttle upstream pressure Pthrup(i), Equation (5) below is used.

$$Gin = \mu \cdot A \cdot \frac{Pthrup(i-1)}{\sqrt{R \cdot T}} \cdot f(Pm/Pthrup(i)) \qquad (5)$$

Gin: throttled air quantity [kg/sec]
μ: flow coefficient
A: effective cross-section area of throttle opening [m²]
Pthrup(i−1): previous throttle upstream pressure [Pa]
Pthrup(i): present throttle upstream pressure [Pa]
Pm: intake air pressure [Pa]
R: gas constant
T: intake temperature [K]
f(Pm/Pthrup(i)): physical value determined based on Pm/Pthrup(i)

In Equation (5), a function for calculating the physical value f(Pm/Pthrup(i)) determined based on the ratio [pm/Pthrup(i)] of the intake air pressure Pm to the present throttle upstream pressure Pthrup(i) is complicated. Therefore, first, by using Equation (6) obtained by transforming Equation (5), the physical value f(Pm/Pthrup(i)) is calculated.

$$f(Pm/Pthrup(i)) = \frac{Gin}{\left(\mu \cdot A / \sqrt{R \cdot T}\right) \cdot Pthrup(i-1)} \qquad (6)$$

Gin: throttled air quantity [kg/sec]
μ: flow coefficient
A: effective cross-section area of throttle opening [m²]
R: gas constant
T: intake temperature [K]
Pthrup(i−1): previous throttle upstream pressure [Pa]

Figure 2A:
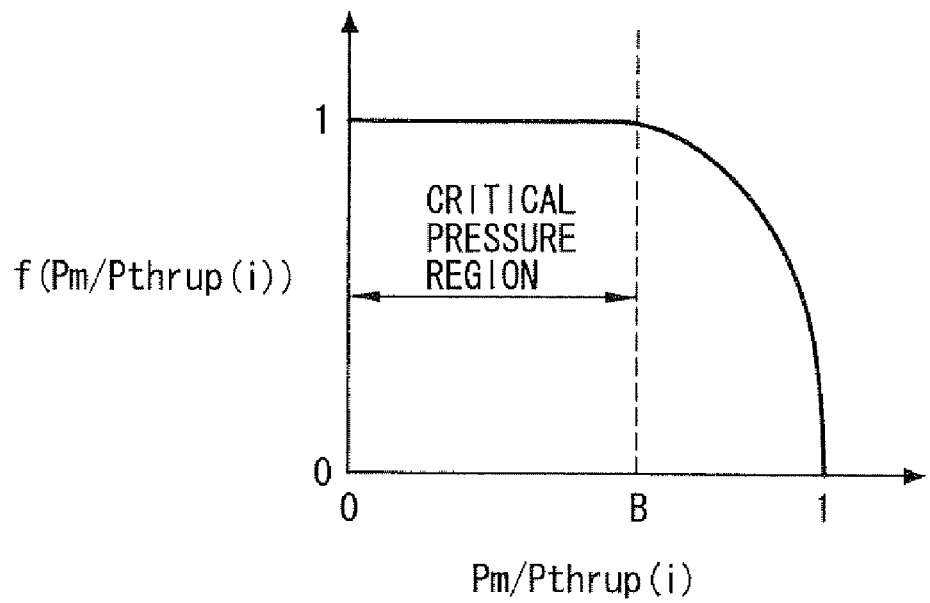
FIG. 2A shows a map of a physical value f(Pm/Pthrup(i)) determined based on a ratio [Pm/Pthrup(i)] of an intake air pressure Pm to a throttle upstream pressure Pthrup(i)
Figure 2B:
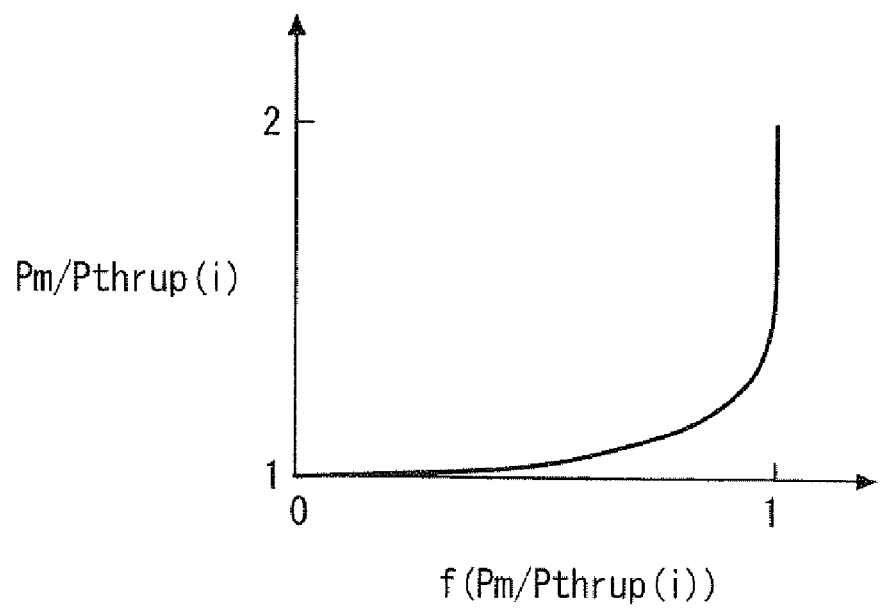
FIG. 2B shows an inverse transform map f{f(Pm/Pthrup(i))} of the physical value f(Pm/Pthrup(i))

After calculating the physical value f(Pm/Pthrup(i)), by using an inverse transform map f{f(Pm/Pthrup(i))} shown in FIG. 2B, a pressure ratio [Pm/Pthrup(i)] corresponding to a calculation value of the physical value f(Pm/Pthrup(i)) is calculated, and the present throttle upstream pressure Pthrup(i) is calculated by the following equation.

$$Pthrup(i) = Pm/f(f(Pm/Pthrup(i))) \qquad (7)$$

As shown in FIG. 2A, in a region where a pressure ratio [Pm/Pthrup(i)] is equal to or smaller than a predetermined value B, the physical value f(Pm/Pthrup(i)) determined based on the pressure ratio [Pm/Pthrup(i)] becomes a steady value fc.

A region where the pressure ratio [Pm/Pthrup(i)] at which the physical value f(Pm/Pthrup(i)) becomes the steady value fc is equal to or smaller than the predetermined value B is called a "critical pressure region" and a region where the pressure ratio is greater than the predetermined value B is called a "non-critical pressure region." The predetermined value B is defined by the following Equation (8).

$$B = \left(\frac{2}{\kappa+1}\right)^{\frac{\kappa}{\kappa-1}} \qquad (8)$$

($\kappa$: ratio of specific heat)

In consideration of the property of the physical value f(Pm/Pthrup(i)), in the non-critical region where a ratio [Pm/Pthrup(i−1)] of the intake air pressure Pm detected by the intake air pressure sensor 18 to the previous throttle upstream pressure Pthrup(i−1) is greater than the predetermined value B, by using Equations (5) and (6) including the previous throttle upstream Pthrup(i−1), the present throttle upstream pressure Pthrup(i) is calculated.

In the critical pressure region where the previous pressure ratio [Pm/Pthrup (i−1)] is equal to or smaller than the predetermined value B, it is regarded that the physical value f(Pm/Pthrup(i)) determined based on the ratio [Pm/Pthrup(i)] of the intake air pressure Pm to the present throttle upstream pressure Pthrup(i) is the steady value fc, and the present throttle upstream pressure Pthrup(i) is calculated by Equation (9) below.

$$Pthrup(i) = \frac{Gin}{\left(\mu \cdot A / \sqrt{R \cdot T}\right) \cdot fc} \qquad (9)$$

Gin: throttled air quantity [kg/sec]
μ: flow coefficient
A: effective cross-sectional area of throttle opening [m²]
R: gas constant
T: intake air temperature [K]
fc: steady value With the above arrangement, in accordance with the pressure ratio [Pm/Pthrup(i)], two equations for calculating the present throttle upstream pressure Pthrup(i) can be switched appropriately, and the present throttle upstream pressure Pthrup(i) can be calculated with high accuracy.

As an initial value of the previous throttle upstream pressure Pthrup(i−1), an intake air pressure Pm detected by the intake air pressure sensor 18 immediately before the startup of the engine is used. That is, when the engine is stopped, the intake passage on both the upstream and downstream sides of the throttle valve 15 is filled with air of atmospheric pressure. Therefore, a value equivalent to the atmospheric pressure may be used as the initial value of the previous throttle upstream pressure Pthrup(i−1). Also, the intake air pressure Pm detected by the intake air pressure sensor 18 immediately before the startup of the engine is a value equivalent to the atmospheric pressure. Therefore, as the initial value of the previous throttle upstream pressure Pthrup(i−1), the intake air pressure Pm immediately before the startup of the engine can be used.

The calculation of the above-described throttle upstream pressure Pthrup(i) is executed by ECU 38 according to routines of FIGS. 5 to 11. Now, processing in each routine will be described.

[Throttle Upstream Pressure Estimating Main Routine]

Figure 5:
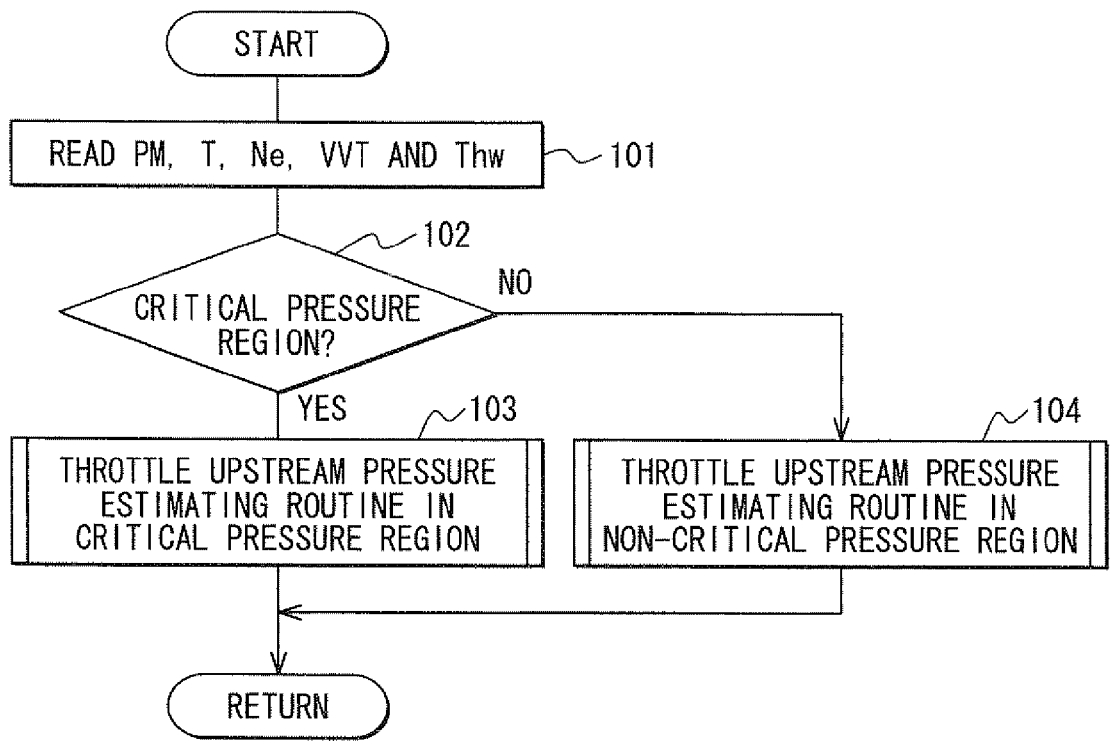
FIG. 5 is a flowchart showing a throttle upstream pressure estimating main routine.

The throttle upstream pressure estimating main routine of FIG. 5 is executed at a predetermined cycle while ECU 38 is turned on. In Step 101, the intake air pressure Pm detected by the intake air pressure sensor 18, intake temperature T, engine rotational speed Ne, valve timing VVT, cooling temperature Thw, etc. are read.

After that, the process advances to Step 102 in which it is determined whether it is a critical pressure region where the ratio [Pm/Pthrup (i−1)] of the intake air pressure Pm to the previous throttle upstream pressure Pthrup (i−1) is less than or equal to the predetermined value B (see FIG. 2A). The intake air pressure Pm detected by the intake air pressure sensor 18 immediately before the startup of the engine is used as an initial value of the previous throttle upstream pressure Pthrup(i−1)

Figure 6:
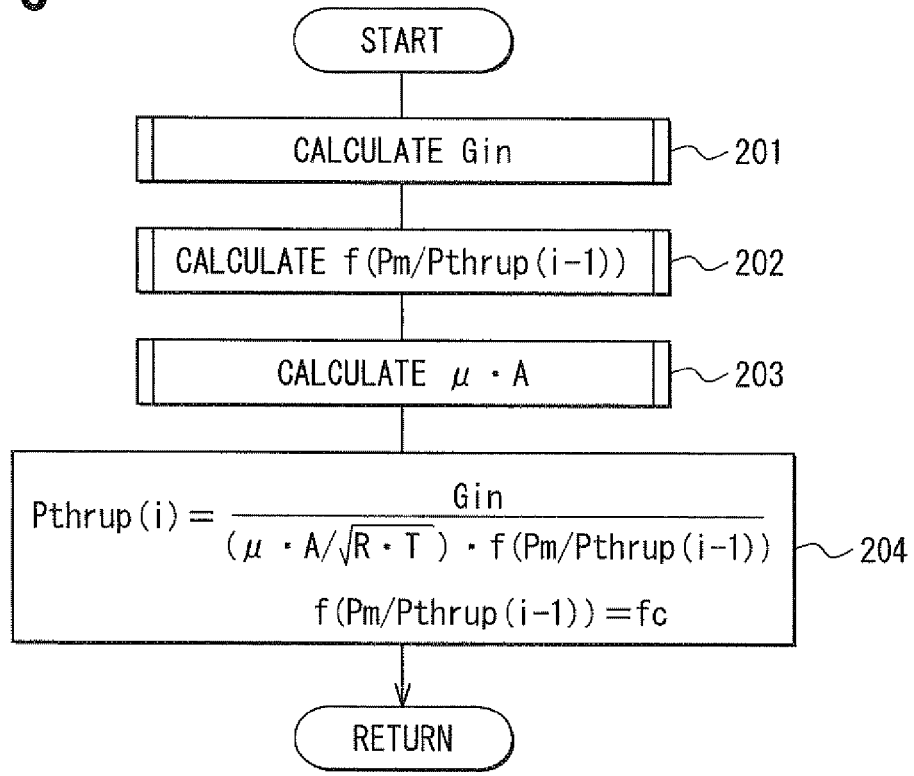
FIG. 6 is a flowchart showing a throttle upstream pressure estimating routine in a critical pressure region.
Figure 7:
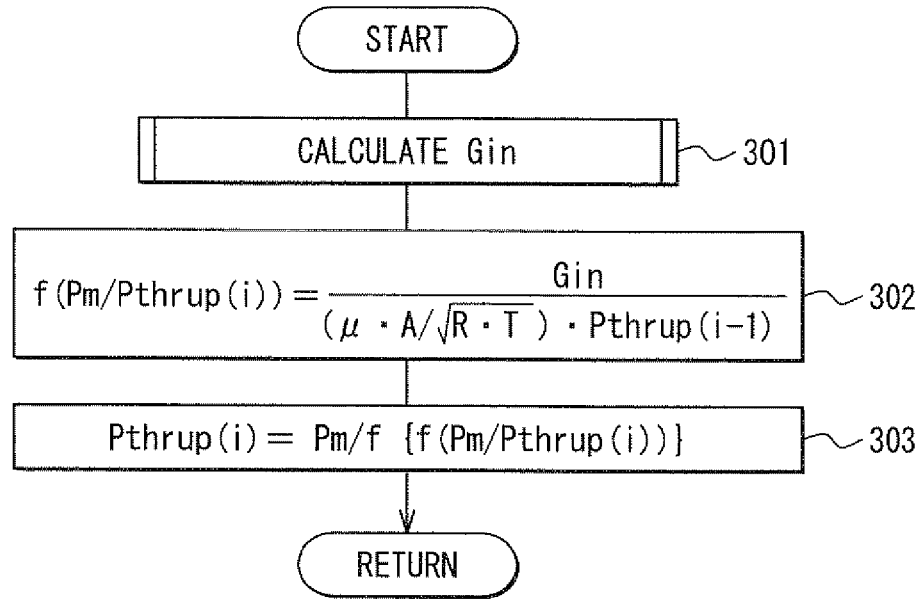
FIG. 7 is a flowchart showing a throttle upstream pressure estimating routine in a non-critical pressure region.

In Step 102, if it is determined that it is in the critical pressure region (Pm/Pthrup (i−1)≦B), the process advances to Step 103 in which a throttle upstream pressure estimating routine in the critical pressure region is executed. FIG. 6 shows the throttle upstream pressure estimating routine in the critical pressure region. When it is determined that it is in a non-critical pressure region (Pm/Pthrup(i−1)>B), the process advances to Step 104 in which a throttle upstream pressure estimating routine in the non-critical pressure region is executed. FIG. 7 shows the throttle upstream pressure estimating routine in the non-critical pressure region.

[Throttle Upstream Pressure Estimating Routine in Critical Pressure Region]

Figure 8:
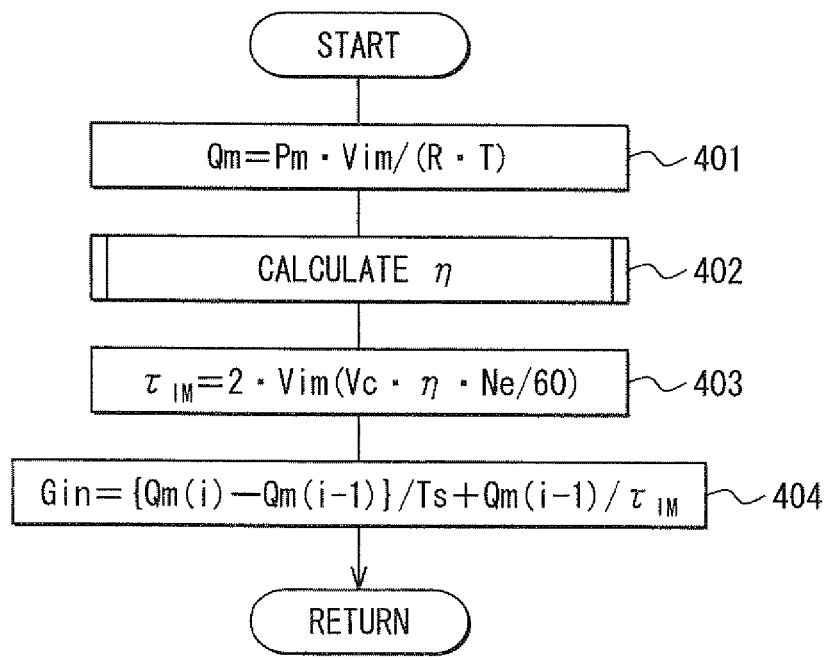
FIG. 8 is a flowchart showing a throttled air quantity calculating routine on the basis of the intake air pressure.

The throttle upstream pressure estimating routine in the critical pressure region of FIG. 6 is a subroutine, executed in Step 103, of the throttle upstream pressure estimating main routine of FIG. 5. In Step 201, a throttled air quantity calculating routine shown in FIG. 8 is executed. Based on the intake air pressure Pm detected by the intake air pressure sensor 18, a throttled air quantity Gin is calculated.

Figure 10:
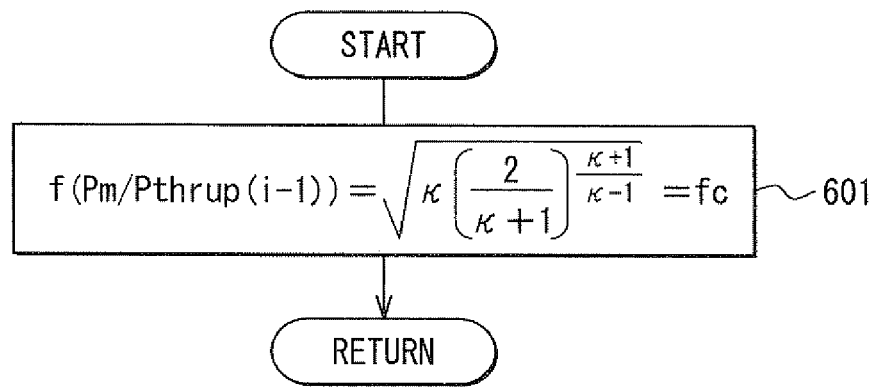
FIG. 10 is a flowchart showing an f(Pm/Pthrup(i−1)) calculating routine in a critical pressure region.

After that, the process advances to Step 202, and an f(Pm/Pthrup(i−1)) calculating routine shown in FIG. 10 is executed to calculate a physical value f(Pm/Pthrup(i−1)) in the critical pressure region. The physical value f (Pm/Pthrup (i−1)) in the critical pressure region is a steady value fc. Then, the process advances to Step 203 in which the throttle flow rate parameter μ·A is calculated by executing a throttle flow rate parameter μ·A calculating routine shown in FIG. 11.

After that, the process advances to Step 204 in which by using the physical value f(Pm/Pthrup(i−1)) in the critical pressure region, the present throttle upstream pressure Pthrup (i) is calculated by following Equation (10).

$$Pthrup(i) = \frac{Gin}{\left(\mu \cdot A \middle/ \sqrt{R \cdot T}\right) \cdot f(Pm/Pthrup(i-1))} \quad (10)$$

$$f(Pm/Pthrup(i-1)) = \text{steady value } fc$$

[Throttle Upstream Pressure Estimating Routine in Non-Critical Pressure Region]

The throttle upstream pressure estimating routine in the non-critical pressure region of FIG. 7 is a subroutine, executed in Step 104, of the throttle upstream pressure estimating main routine of FIG. 5. In Step 301, the throttled air quantity calculating routine shown in FIG. 8 is executed to calculate the throttled air quantity Gin based on the intake air pressure Pm detected by the intake air pressure sensor 18.

Subsequently, the process advances to Step 302. By using the previous throttle upstream pressure Pthrup(i−1), the physical value f(Pm/Pthrup(i)) determined based on a pressure ratio [Pm/Pthrup(i)] is calculated by the following Equation (11).

$$f(Pm/Pthrup(i)) = \frac{Gin}{\left(\mu \cdot A \middle/ \sqrt{R \cdot T}\right) \cdot Pthrup(i-1)} \quad (11)$$

After that, the process advances to Step 303, and by using the inverse transform map f{f(Pm/Pthrup(i))} of the physical value f(Pm/Pthrup(i)) shown in FIG. 2B, a pressure ratio [Pm/Pthrup(i)] corresponding to a calculated value of the physical value f(Pm/Pthrup(i)) is calculated, and the present throttle upstream pressure Pthrup(i) is calculated by the following Equation.

$$Pthrup(i)=Pm/f\{f(Pm/Pthrup(i))\}$$

[Throttled Air Quantity Calculating Routine Based on Intake Air Pressure]

The throttled air quantity calculating routine based on the intake air pressure of FIG. 8 is a subroutines executed in Step 201 of FIG. 6 and Step 301 of FIG. 7. In Step 401, based on the intake air pressure Pm, an air quantity Qm downstream of the throttle valve in the intake passage is calculated by the following Equation (12).

$$Qm=Pm \cdot Vim/(R \cdot T) \quad (12)$$

where Vim represents a volume of the intake passage downstream of the throttle valve 15, R represents the gas constant, and T represents the intake air temperature.

Subsequently, the process advances to Step 402. By executing a volumetric efficiency η calculating routine shown in FIG. 9, volumetric efficiency η is calculated. In Step 403, by using the volumetric efficiency η, a model time constant τIM is calculated by the following Equation (13).

$$\tau IM=2 \cdot Vim/(Vc \cdot \eta \cdot Ne/60) \quad (13)$$

where Vim represents a volume of intake passage downstream of the throttle valve 15, Vc represents a volume of the cylinder, and Ne represents an engine speed (rpm).

After that, the process advances to Step 404. By using the model time constant τIM, a throttled air quantity Gin based on the intake air pressure Pm is calculated by the following equation.

$$Gin = \{Qm(i) - Qm(i-1)\}/Ts + Qm(i-1)/\tau IM \quad (14)$$

where Qm(i) represents a present air quantity in the intake passage downstream of the throttle valve 15, Qm(i−1) represents a previous air quantity in the intake passage downstream of the throttle valve 15, and Ts represents a sampling time.

[Volumetric Efficiency η Calculating Routine]

Figure 9:
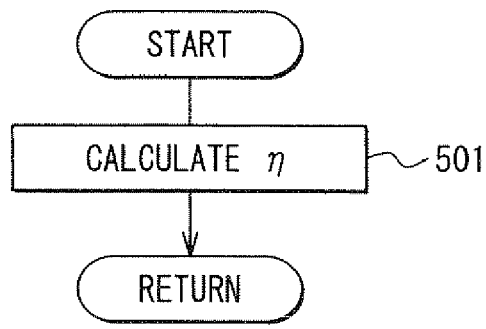
FIG. 9 is a flowchart showing a volumetric efficiency $\eta$ calculating routine.

The volumetric efficiency η calculating routine shown in FIG. 9 is a subroutine, which is executed in Step 402 of the throttled air quantity calculating routine. In Step 501, according to a volumetric efficiency map using the pressure ratio [Pm/Pthrup(i−1)], engine rotational speed Ne, and valve timing VVT as parameters, the base volumetric efficiency ηr according to the present engine operating condition is calculated. Then, the base volumetric efficiency ηr is corrected by using a correction value corresponding to the coolant temperature Thw to obtain the volumetric efficiency η.

[f(Pm/Pthrup(i−1)) Calculating Routine in Critical Pressure Region]

The f(Pm/Pthrup(i−1)) calculating routine in the critical pressure region shown in FIG. 10 is a subroutine, executed in Step 202 of the throttle upstream pressure estimating routine. In Step 601, the physical value f(Pm/Pthrup(i−1)) in the critical pressure region is calculated by the following Equation (15).

$$f(Pm/Pthrup(i-1)) = \sqrt{\kappa \cdot \left(\frac{2}{\kappa+1}\right)^{\frac{\kappa+1}{\kappa-1}}} = \text{steady value } fc \quad (15)$$

(κ: ratio of specific heat)

Since the physical value f(Pm/Pthrup(i−1)) in the critical pressure region is a steady value fc, the steady value fc calculated by the above equation in advance may be stored in ROM of ECU 38.

[Throttle Flow Rate Parameter μ·A Calculating Routine]

Figure 11:
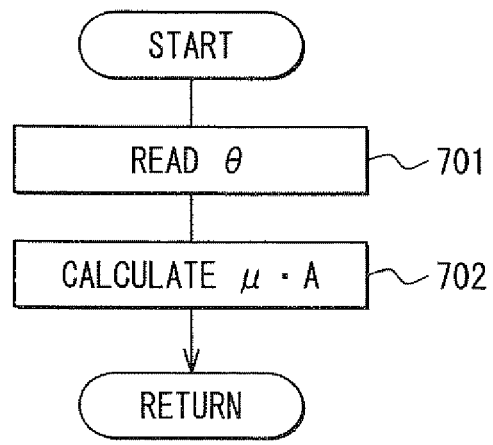
FIG. 11 is a flowchart showing a throttle flow rate parameter $\mu \cdot A$ calculating routine.

The throttle flow rate parameter μ·A calculating routine shown in FIG. 11 is a subroutine, executed in Step 203 of the throttle upstream pressure estimating routine. In Step 701, a present throttle opening degree θ is read. Then, in subsequent Step 702, a map of the throttle flow rate parameter μ·A using the throttle opening degree θ as a parameter is searched, and a throttle flow rate parameter μ·A corresponding to the present throttle opening degree θ is calculated.

Also, an effective cross-sectional area A of the throttle opening may be calculated from the present throttle opening degree θ by Equation (2), and the throttle flow rate parameter μ·A may be found by multiplying the effective cross-sectional area A of the throttle opening with a flow coefficient μ.

The present throttle upstream pressure Pthrup(i) estimated by the routines in FIGS. 5 to 11 described above is used when estimating a cylinder charged air quantity by using the intake system model.

In the present embodiment described above, as shown in FIGS. 3 and 4, in consideration of the fact that, during a transient state, even when the intake air pressure Pm changes sharply in a step-like manner, a change in the throttle upstream pressure is small in comparison with the change in the intake air pressure Pm and a difference between the previous throttle upstream pressure Pthrup(i−1) and the present throttle upstream pressure Pthrup(i) is very small, by substituting the previous throttle upstream pressure Pthrup(i−1) for one of the throttle upstream pressures Pthrup(i) of two terms included in the equation of the intake system model, it becomes possible to solve the equation of the intake system model for the present throttle upstream pressure Pthrup(i) while securing accuracy of the model. Accordingly, it becomes possible to calculate the throttle upstream pressure Pthrup(i) with high accuracy by using the intake system model that calculates a cylinder charged air quantity. Therefore, it is possible to secure the estimation accuracy of the throttle upstream pressure Pthrup(i) while eliminating or reducing the adaptation work time for the model to be used for estimating the throttle upstream pressure Pthrup(i).

Next, the charged air quantity Gcf is calculated by using the intake system model in the following manner.

The following relationship is derived when the law of mass conservation is applied to the flow of intake air flowing in an intake passage connecting from the throttle valve 15 to an intake port of the engine 11 (hereafter referred to as "throttle downstream intake passage").

$$d/dt \cdot Qm = Gin - Gcf \quad (16)$$

where Qm represents an air quantity in the throttle downstream intake passage, d/dt·Qm represents a change of the air quantity in the throttle downstream intake passage, Gin represents the throttled air quantity, and Gcf represents the cylinder charged air quantity.

Furthermore, the following relationship is derived when the equation of gas state is applied to the throttle downstream passage.

$$Gcf = \eta \cdot (Ne/2) \cdot Vc \cdot (Qm/VIM) \quad (17)$$

η: volumetric efficiency
Ne: engine speed [rps]
Vc: cylinder volume [m³]
VIM: volume of throttle downstream intake passage [m³]

The volumetric efficiency η is variable depending on an intake air flow rate. Therefore, the volumetric efficiency η is obtained from a map etc. defined by engine speed Ne and intake air pressure Pm which are the parameters correlating with the intake air flow rate.

$$\eta = f(Ne, Pm) \quad (18)$$

Furthermore, the time constant τIM of the intake system model is defined by the following Equation.

$$\tau IM = 2 \cdot VIM/(Vc \cdot \eta \cdot Ne) \quad (19)$$

The following Equation is derived from the above Equations (16) to (19).

$$d/dt \cdot Qm = Gin - Qm/\tau IM \quad (20)$$

As the above Equation (20) is an equation of continuity, in order to enable ECU 38 to calculate it, it can be converted into the following discreet Equation (21).

$$\{Qm(i) - Qm(i-1)\}/Ts = Gin(i) - Qm(i-1)/\tau IM \quad (21)$$

where Ts is a sampling time.

The Equation (21) can be modified in the following manner to derive the air quantity Qm in the throttle downstream intake passage.

$$Qm(i) = \{Gin(i) - Qm(i-1)/\tau IM\} \cdot Ts + Qm(i-1) \, [kg] \quad (22)$$

Moreover, the following Equation for calculating the intake air pressure Pm based on the air quantity Qm in the throttle downstream intake passage is derived when the Equation of gas state is applied to the throttle downstream intake passage.

$$Pm = Qm \cdot R \cdot T / VIM [Pa] \quad (23)$$

R: gas constant
T: intake temperature

The following relationship is derived from the above Equations (23) and (17) to obtain the cylinder charged air quantity Gcf.

$$Gcf = \eta \cdot Vc \cdot Pm / (2 \cdot R \cdot T)[kg/rev] \quad (24)$$

ECU 38 calculates the cylinder charged air quantity Gcf by using Equation (24) derived from each equation of the above-described intake system model.

It becomes possible by using Equation (2) that an effective cross-section area A of the throttle opening is calculated from a throttle opening degree θ, and the throttle opening effective cross-section area A is multiplied with a flow coefficient μ to find a flow rate parameter (hereafter referred to as "throttle flow rate parameter") μ·A depending on the throttle opening degree θ. In the present embodiment, however, in order to simplify calculation of the throttle flow rate parameter μ·A to reduce the CPU load of ECU 38, a map (table) of adaptation values of the throttle flow rate parameter μ·A using the throttle opening degree θ as a parameter is stored in ROM (storage means) of ECU 38 in advance and, by searching the map, a throttle flow rate parameter μ·A corresponding to the present throttle opening degree θ is read.

However, when a cylinder charged air quantity Gcf is calculated by using a map value (adaptation value) of the throttle flow rate parameter μ·A as it is, due to manufacture dispersion or aging of parts (throttle valve 15 etc.) of the intake system, the throttle opening sensor 16, etc., a difference is caused between the map value (adaptation value) of the throttle flow rate parameter μ·A and an actual value of the throttle flow rate parameter μ·A in an actual vehicle, degrading the calculation accuracy of the cylinder charged air quantity Gcf.

In the present invention, therefore, during an engine operating state, the map value of the throttle flow rate parameter μ·A is learned and corrected as follows.

First, when a predetermined learning execution condition is satisfied during the engine operating state, by using Equation (25) below derived from the equation for calculating the throttled air quantity of the intake system model, an actual value of the throttle flow rate parameter μ·A according to the present throttle opening degree θ is calculated.

$$\mu \cdot A = \frac{Gin \cdot \sqrt{R \cdot T}}{Pthrup \cdot f(Pm/Pthrup)} \quad (25)$$

Then, based on a deviation between the actual value of the throttle flow rate parameter μ·A calculated by the above Equation and the map value, a learning correction amount corresponding to the map value is learned. Further, during the engine operating state, the map value of the throttle flow rate parameter μ·A according to the present throttle opening degree θ is corrected by using the above learning correction amount and, by using the corrected map value, a throttled air quantity Gin is calculated to calculate the cylinder charged air quantity Gcf.

In the present embodiment, considering that the engine 11 is equipped with the supercharger 25, as a learning execution condition of the learning correction amount of the throttle flow rate parameter μ·A, the following three conditions (1) to (3) are set. When these three conditions (1) to (3) are all satisfied, the learning execution condition is fulfilled.

(1) The engine operating condition is a steady operation in which a change in the intake air flow rate is small.
(2) Being in a low air quantity region where an intake air flow rate is equal to or smaller than a predetermined value C.
(3) The ratio Pm/Pthrup of the throttle downstream pressure Pm to the throttle upstream pressure Pthrup is less than or equal to a predetermined value B.

With respect to Condition (1), during a steady operation state where a change in the intake air flow rate is small, a state where the relationship between the throttle opening degree θ and the throttle flow rate parameter μ·A is regarded to be substantially constant continues. Thus, being a steady operation state is defined as one of the conditions necessary for calculating, by using Equation (25) derived from the equation for calculating the throttled air quantity of the intake system model, the actual value of the throttle flow rate parameter μ·A with high accuracy.

Figure 12:
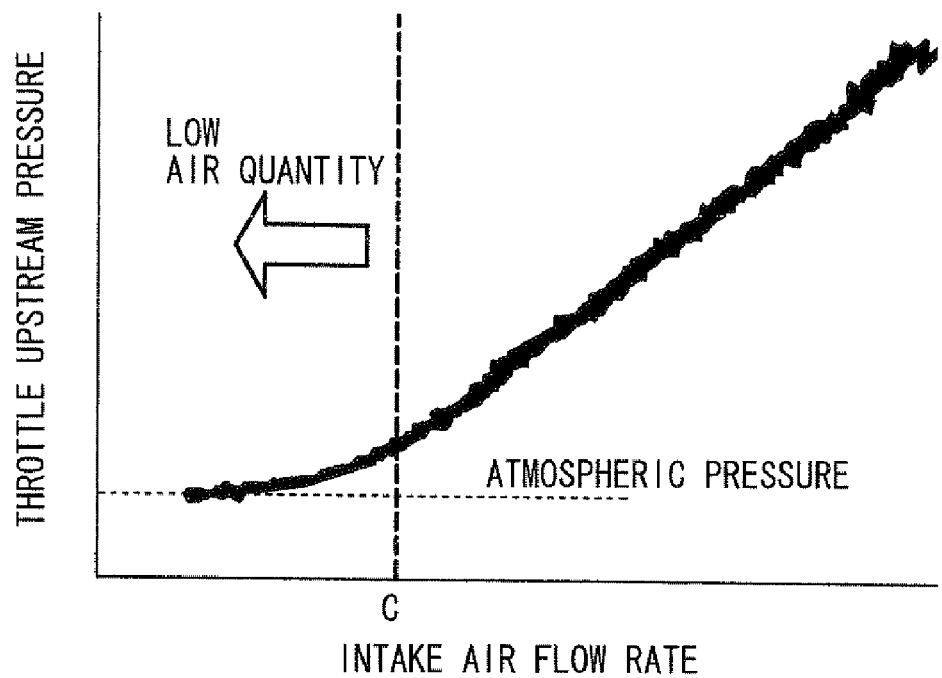
FIG. 12 is a diagram for explaining the relation between an intake air quantity and a throttle upstream pressure.

Further, with respect to Condition (2), in an operation range where a charged pressure by the supercharger 25 occurs, due to the charged pressure, the throttle upstream pressure Pthrup becomes higher than an atmospheric pressure. Therefore, a throttle upstream pressure sensor for detecting the throttle upstream pressure Pthrup is required, or it is necessary to estimate the throttle upstream pressure Pthrup. However, as shown in FIG. 12, in a low air quantity region where the intake air flow rate is equal to or smaller than a predetermined value C, the charged pressure by the supercharger 25 hardly occurs, and the throttle upstream pressure Pthrup becomes substantially equivalent to an atmospheric pressure. Therefore, it becomes possible to use a detection value of the atmospheric pressure sensor 39 as a throttle upstream pressure Pthrup. From this viewpoint, in the engine 11 equipped with the supercharger 25, as a learning execution condition, being in a low air quantity region where the intake air quantity is equal to or smaller than the predetermined value C is defined as Condition (2).

Further, in Equation (25) for calculating the throttle flow rate parameter μ·A, the physical value f(Pm/Pthrup) determined based on a ratio Pm/Pthrup of the throttle downstream pressure Pm to the throttle upstream pressure Pthrup becomes a steady value fc in a critical pressure region where the pressure ratio Pm/Pthrup is less than or equal to a predetermined value B (see FIG. 2A). In the critical pressure region, when approximating the throttle upstream pressure Pthrup by the detection value of the atmospheric pressure sensor 391 an approximation error can be eliminated to some extent. From this viewpoint, in the engine 11 equipped with the supercharger 25, as a learning execution condition, the pressure ratio Pm/Pthrup being less than or equal to the predetermined value B is defined as Condition (3).

When a throttle opening degree θ changes, the throttle flow rate parameter μ·A A also changes. As a result, the deviation between the map value of the throttle flow rate parameter μ·A and the actual value also changes according to a change in the throttle opening degree θ.

Figure 14:
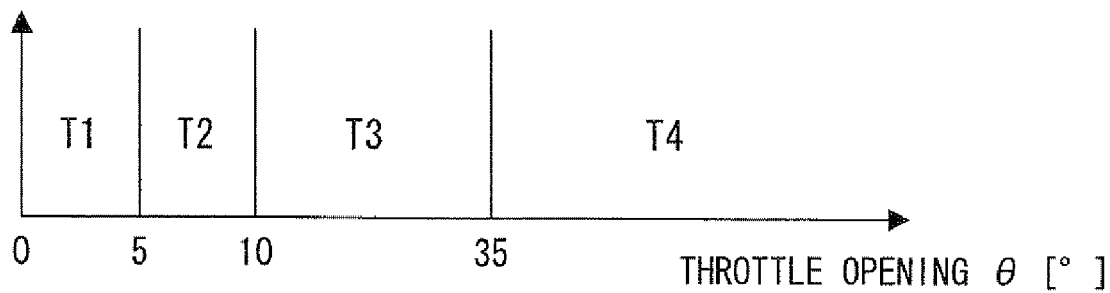
FIG. 14 is a diagram for explaining classification of the learning region according to a throttle opening degree.

In view of the above, in the present embodiment, as shown in FIG. 14, the region of the throttle opening degree θ from the fully closed to fully opened state is divided into a plurality of learning regions Ti (i=1 to 4), and for each learning region Ti, based on the deviation between the map value of the throttle flow rate parameter μ·A and the actual value, a learning correction amount is learned. With this arrangement, it is possible to learn a learning correction amount by dividing the region of the throttle opening degree θ from the fully closed to fully opened state into regions Ti where the deviation between the map value of the throttle flow rate parameter μ·A and the actual value is substantially the same, improving the learning accuracy of the learning correction amount.

Figure 13:
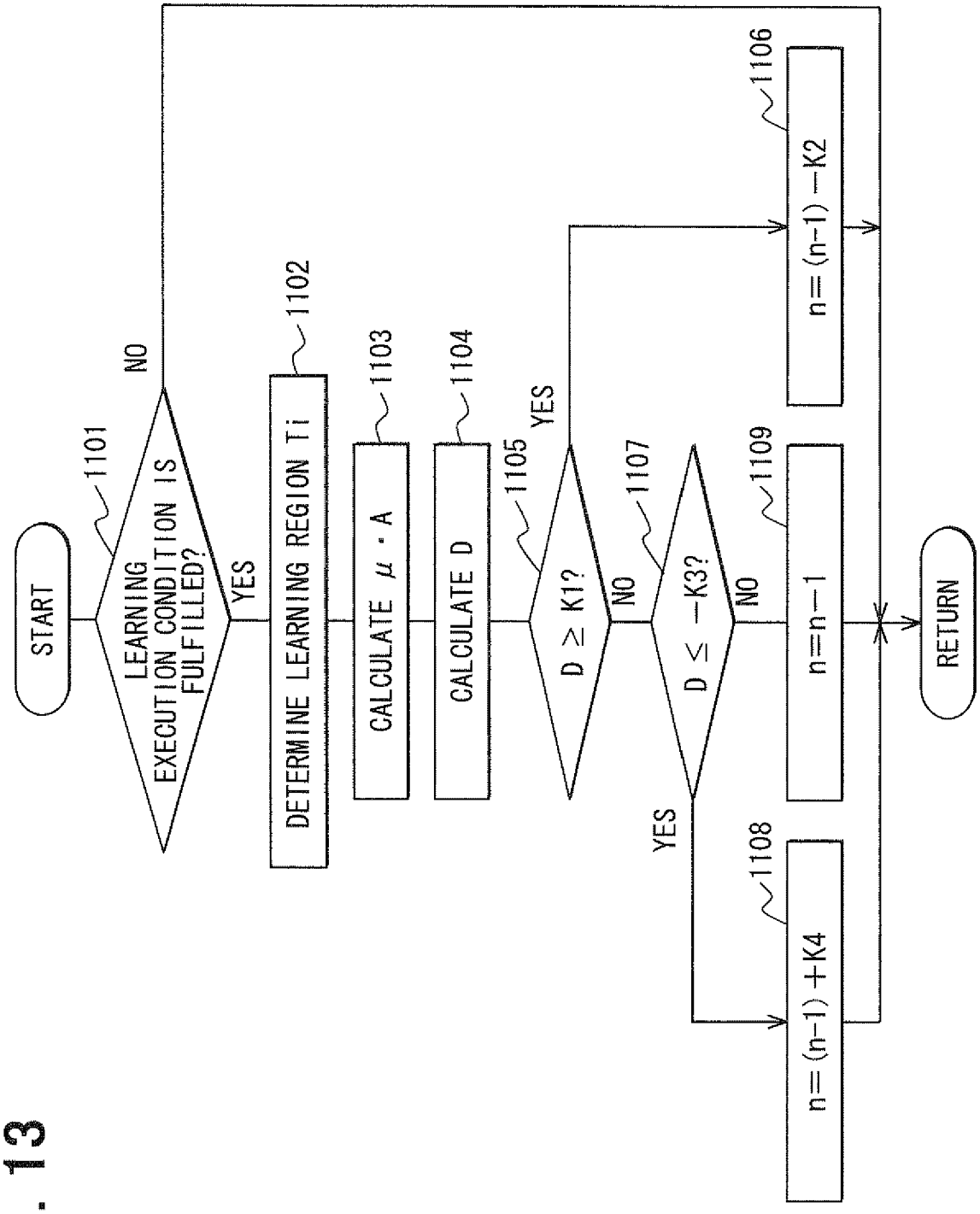
FIG. 13 is a flowchart showing a throttle flow rate parameter learning correction amount learning routine.

The processing for learning the learning correction amount of the throttle flow rate parameter μ·A described above is executed by ECU 38 as follows according to the throttle flow rate parameter learning correction amount learning routine shown in FIG. 13. The routine is executed during the engine operating condition at a predetermined cycle.

In Step 1101, it is determined whether the learning execution condition is fulfilled based on whether the following three conditions are all satisfied.

(1) Being in a steady operation state where a change in the intake air flow rate is small.

(2) Being in a low air quantity region where the intake air flow rate is less than or equal to the predetermined value C.

(3) The ratio Pm/Pthrup of the throttle downstream pressure Pm to the throttle upstream pressure Pthrup is less than or equal to the predetermined value B.

Of the three conditions (1) to (3), if there is at least one condition which is not satisfied, the learning execution conditions is not established, and the routine is ended without the rest of the processing being executed.

In contract, when the three conditions (1) to (3) are all satisfied, the learning execution condition is fulfilled. Therefore, the process advances to Step 1102, and it is determined which learning region Ti (i=1 to 4) of FIG. 14 the present throttle opening degree θ detected by the throttle opening sensor 16 corresponds to.

In the present embodiment, considering that the smaller the throttle opening degree θ is, the relatively greater the influence of the deviation between the map value of the throttle flow rate parameter μ·A and the actual value becomes, it is set such that the smaller the throttle opening degree θ is, the narrower the learning region Ti becomes. As a result, it is set such that the smaller the throttle opening degree θ is, the higher the accuracy of the learning correction amount becomes.

In Step 1103, by using Equation (26) below, an actual value of the throttle flow rate parameter μ·A corresponding to the present throttle opening degree θ is calculated.

$$\mu \cdot A = \frac{Gin \cdot \sqrt{R \cdot T}}{Pthrup \cdot f(Pm/Pthrup)} \quad (26)$$

In this case, the operation region where the learning execution condition is fulfilled is a critical pressure region where a ratio Pm/Pthrup of the throttle downstream pressure Pm to the throttle upstream pressure Pthrup is less than or equal to the predetermined value B. Therefore, the physical value f(Pm/Pthrup) determined based on the pressure ratio Pm/Pthrup is a steady value fc. Also, the operation region where the learning execution condition is fulfilled is a low air quantity region where the intake air flow rate is less than or equal to the predetermined value C. Therefore, there occurs little charged pressure of the supercharger 25, and the throttle upstream pressure Pthrup is substantially equal to an atmospheric pressure. Therefore, it becomes possible to use the detection value of the atmospheric pressure sensor 39 as a throttle upstream pressure Pthrup. As a result, even if the throttle upstream pressure sensor is not provided, by using Equation (26), an actual value of the throttle flow rate parameter μ·A corresponding to the present throttle opening degree θ can easily and accurately be calculated.

After that, the process advances to Step 1104 and the map of the throttle flow rate parameter μ·A stored in ROM (storage means) of ECU 38 is searched. Then, a map value of the throttle flow rate parameter μ·A corresponding to the present throttle opening degree θ is read, and the deviation D between the map value and the actual value of the throttle flow rate parameter μ·A is calculated.

Deviation D=Map value−Actual value

After that, the process advances to Step 1105, and it is determined whether the deviation D is greater than or equal to a predetermined value K1 (whether or not the map value is greater than the actual value by the predetermined value K1 or greater). When the deviation D is greater than or equal to the predetermined value K1, the process advances to Step 1106, and the value obtained by subtracting a predetermined value K2 from the previous learning correction amount (n−1) is updated and stored in a rewritable nonvolatile memory such as backup RAM of ECU 38 as a present learning correction amount (n). Thus, the learning correction amount (n) of the learning region Ti corresponding to the present throttle opening degree θ is updated. In this regard, the relationship between the predetermined values K1 and K2 used in Steps 1105 and 1106 are set as: K1>K2>0.

When a state where the deviation D is greater than or equal to the predetermined value K1 (state where the map value is greater than the actual value by the predetermined value K1 or greater) continues, the learning processing in Step 1106 is repeated, and the learning correction amount (n) gradually increases in the negative direction.

In Step 1105, when it is determined that the deviation D is smaller than the predetermined value K1, the process advances to Step 1107 and it is determined whether the deviation D is less than or equal to a predetermined value "−K3" (whether the map value is smaller than the actual value by the predetermined value K3 or greater). If the deviation D is less than or equal to the predetermined value "−K3", the process advances to Step 1108, and a value obtained by adding a predetermined value K4 to the previous learning correction amount (n−1) is updated and stored in a rewritable nonvolatile memory such as backup RAM of ECU 38 as a present learning correction amount (n). With this arrangement, the learning correction amount (n) of the learning region Ti corresponding to the present throttle opening degree a is updated. In this regard, the relationship between the predetermined values "−K3" and "K4" used in Steps 1107 and 1108, respectively, is set as: |−K3|>K4>0.

When a state where the deviation D is less than or equal to the predetermined value "−K3" (state where the map value is smaller than the actual value by the predetermined value K3 or greater) continues, the learning processing in Step 1106 is repeated and the learning correction amount (n) gradually increases in the positive direction.

In contract, both in Steps 1105 and 1107, when the answers are No, namely, when it is determined that K1>deviation D>−K3, the process advances to Step 1109 and the previous learning correction amount (n−1) is updated and stored as it is in the rewritable nonvolatile memory such as backup RAM of ECU 38 as a present learning correction amount (n).

Further, the learning method of the learning correction amount (n) may be modified as required, such as setting the learning correction amount (n) by using a map etc. according to the deviation D.

During the engine operating state, ECU 38 searches the map of the throttle flow rate parameter μ·A stored in the ROM (storage means), reads the map value of the throttle flow rate parameter μ·A corresponding to the present throttle opening degree θ, and corrects the map value by using the learning correction amount. Then, by using the map value after correction, ECU 38 calculates a throttled air quantity Gin to calculate a cylinder charged air quantity Gcf.

According to the present embodiment described above, when a predetermined learning execution condition is fulfilled, by using the equation derived from the equation for calculating the throttled air quantity of the intake model, the actual value of the throttled flow rate parameter μ·A corresponding to the present throttle opening degree θ is calculated. Based on the deviation D between the actual value and the map value (adaptation value), a learning correction amount corresponding to the map value is learned. Then, during the engine operating state, the map value of the throttle flow rate parameter μ·A corresponding to the present throttle opening degree θ is corrected by using the previous learning correction amount. After that, by using the corrected map value, the cylinder charged air quantity is calculated. Therefore, even when a difference is caused between the map value (adaptation value) of the throttle flow rate parameter μ·A and the actual value of the throttle flow rate parameter μ·A in an actual vehicle due to manufacture dispersion or aging of parts of the intake system and the throttle opening sensor 15, the map value of the throttle flow rate parameter μ·A can properly be corrected by using the learning correction amount learned based on the deviation D between the actual value and the map value. As a result, accuracy of the throttle flow rate parameter μ·A can be improved by simple processing. Further, while meeting the demand for load reduction in calculation by ECU 38, calculation accuracy of the cylinder charged air quantity can be improved, and dispersion of drivability of vehicles and dispersion of emission can be reduced.

The present invention can be applied to the engine with a supercharger having a throttle upstream pressure sensor. In a system having the throttle upstream pressure sensor, a throttle upstream pressure Pthrup can be detected by the throttle upstream pressure sensor. Therefore, even in an operation range where a charged pressure by the supercharger 25 occurs, the learning correction amount can be learned.

Further, the present invention can be applied to a naturally aspirated engine without a supercharger. When the present invention is applied to the naturally aspirated engine, a steady operation state where a change in the intake air quantity is small may be defined as the learning execution condition. During the steady operation state, a state where the relationship between the throttle opening degree θ and the throttle flow rate parameter μ·A can be regarded as substantially constant continues. Therefore, by using an equation derived from the equation for calculating a throttled air quantity of the intake system model, the actual value of the throttle flow rate parameter μ·A can be calculated accurately.

Also, in a system having throttle upstream pressure estimator calculating the throttled air quantity of the intake system model, the map value of the throttle flow rate parameter μ·A may be corrected during the engine operating state by using the learning correction amount, and the corrected map value may be substituted for the equation derived from the intake system model to calculate the throttle upstream pressure Pthrup.

Figure 15:
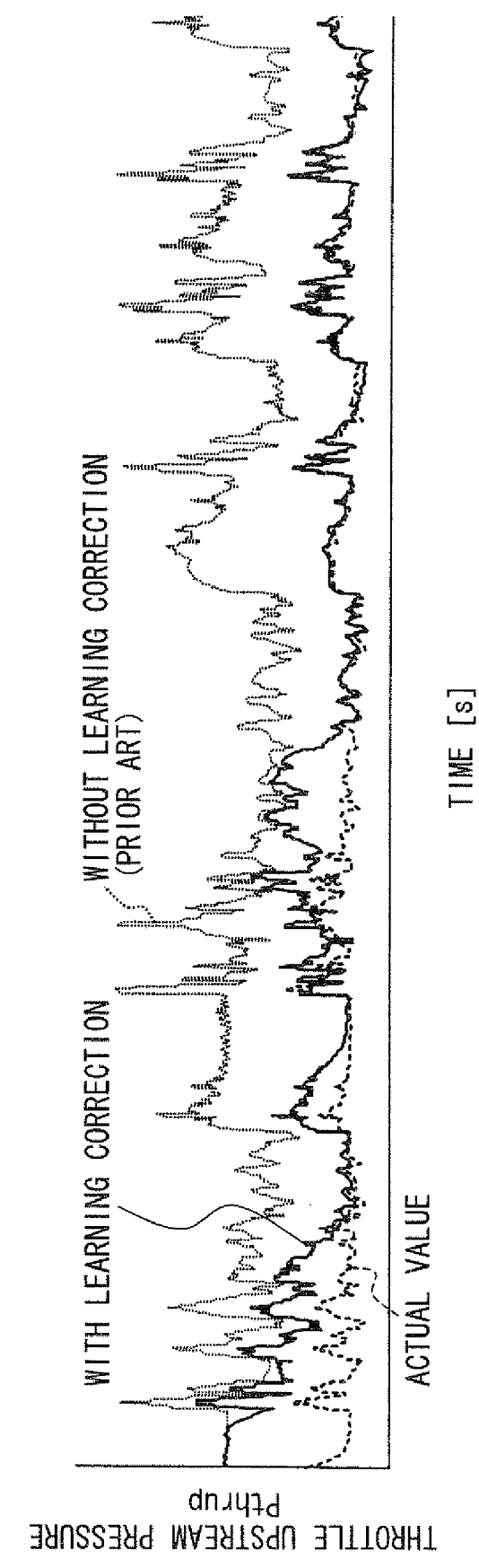
FIG. 15 is a time chart showing a difference between an estimated value of the throttle upstream pressure Pthrup estimated by using an intake system model and an actual value (simulation value) and learning correction effects.

FIG. 15 is a time chart showing a difference between a value of the throttle upstream pressure Pthrup estimated by using the intake system model and an actual value (simulation value) and a learning correction effect. It is conceivable that the difference is caused by a difference taking place between the map value (adaptation value) of the throttle flow rate parameter μ·A and the actual value of the throttle flow rate parameter μ·A in an actual vehicle due to manufacture dispersion or aging of parts of the intake system, the throttle opening sensor 15, and the like. In such a case, if the map value of the throttle flow rate parameter μ·A is corrected by using the learning correction amount and a throttle upstream pressure Pthrup is estimated by using the corrected map value, as shown in FIG. 15, it becomes possible to allow the estimated value of the throttle upstream pressure Pthrup to substantially match the actual value (simulation value), improving the calculation accuracy of the throttle upstream pressure Pthrup.

Further, the present invention can be applied not only to an engine with a supercharger but also to a naturally aspirated engine which is not equipped with a supercharger.

What is claimed is:

1. A throttle upstream pressure estimating apparatus for an internal combustion engine comprising:

intake air pressure detecting means for detecting an intake air pressure Pm, which represents a pressure downstream of a throttle valve provided in an intake passage of the internal combustion engine; and throttle upstream pressure estimating means for repeatedly calculating a throttle upstream pressure, which represents a pressure upstream of the throttle valve, at a predetermined time intervals by using an equation of an intake system model which models behaviors of an intake air during a period where a change in the throttle upstream pressure and a change in a throttle opening degree cause a change in the intake air pressure Pm so as to cause a change in an actual cylinder charged air quantity, wherein the throttle upstream pressure estimating means substitutes a previous throttle upstream pressure Pthrup(i−1) for a part of a plurality of throttle upstream pressures included in the equation of the intake system model to calculate a present throttle upstream pressure Pthrup(i), and wherein the equation of the intake system model is represented by the following Equation:

$$Gin = \mu \cdot A \frac{Pthrup(i-1)}{\sqrt{R \cdot T}} \cdot f(Pm/Pthrup(i))$$

Gin: throttled air quantity [kg/sec]
μ: flow coefficient
A: effective cross-sectional area of throttle opening [m$^2$]
Pthrup(i−1): Previous throttle upstream pressure [Pa]
Pthrup(i): Present throttle upstream pressure [Pa]
Pm: intake air pressure [Pa]
R: gas constant
T: intake air temperature [K]
f(Pm/Pthrup(i)): physical value determined based on Pm/Pthrup(i)
A=πr$^2$(1−cos$^2$θ)
r: radius of throttle valve [m]
θ: throttle opening degree.

2. A throttle upstream pressure estimating apparatus according to claim 1, wherein the throttle upstream pressure estimating means calculates a present throttle upstream pressure Pthrup(i) by using the equation based on the previous throttle upstream pressure Pthrup(i−1) when a ratio (Pm/Pthrup(i−1)) of the intake air pressure Pm detected by the intake air pressure detecting means to the previous throttle upstream pressure Pthrup(i−1) is greater than a predetermined value; and wherein the throttle upstream pressure estimating means regards a physical value f(Pm/Pthrup(i)) determined based on a ratio (Pm/Pthrup(i)) of the intake air pressure Pm to the present throttle upstream pressure Pthrup(i) as a steady value fc when the pressure ratio (Pm/Pthrup(i−1)) is less than or equal to the predetermined value and calculates a present throttle upstream pressure Pthrup(i) according to the following Equation:

$$Pthrup(i) = \frac{Gin}{(\mu \cdot A\sqrt{R \cdot T}) \cdot fc}$$

Gin: throttle air quantity [kg/sec]
μ: flow coefficient
A: effective cross-sectional area of throttle opening [m²]
R: gas constant
T: intake temperature [K]
fc: steady value.

3. A throttle upstream pressure estimating apparatus according to claim 1, wherein the throttle upstream pressure estimating means uses, as an initial value of the previous throttle upstream pressure Pthrup(i−1), the intake air pressure Pm detected by the intake air pressure detecting means immediately before a startup of the internal combustion engine.

* * * * *